United States Patent [19]

DuRocher et al.

[11] Patent Number: 5,235,734
[45] Date of Patent: Aug. 17, 1993

[54] COLLAPSIBLE STEERING SHAFT APPARATUS AND METHOD OF MAKING SAME

[75] Inventors: Daniel J. DuRocher, Leonard; Ellsworth S. Miller, Rochester Hills, both of Mich.

[73] Assignee: ITT Corporation, New York, N.Y.

[21] Appl. No.: 787,190

[22] Filed: Nov. 4, 1991

[51] Int. Cl.⁵ .............................................. B21D 39/00
[52] U.S. Cl. ..................................... 29/455.1; 29/516; 74/492; 74/493; 280/777
[58] Field of Search .................. 280/775, 777; 74/492, 74/493; 29/434, 464, 466, 516, 517, 521, 455.1

[56] References Cited

U.S. PATENT DOCUMENTS

| | | |
|---|---|---|
| 1,823,158 | 9/1931 | Mogford et al. . |
| 2,852,843 | 9/1958 | Banta et al. ............................. 29/517 |
| 3,492,888 | 2/1970 | Nishimura et al. ............. 280/777 X |
| 4,098,141 | 7/1978 | Yamaguchi . |
| 4,269,043 | 5/1981 | Kizu et al. . |
| 4,377,967 | 7/1982 | Yoshida et al. ...................... 280/777 |
| 4,572,022 | 2/1986 | Mettler ................................... 74/492 |
| 4,622,840 | 11/1986 | Diffenderfer et al. . |
| 4,632,424 | 12/1986 | Morris . |
| 4,667,530 | 5/1987 | Mattler et al. . |
| 4,674,354 | 6/1987 | Brand .............................. 280/777 X |
| 5,052,715 | 10/1991 | Ervin et al. ..................... 280/777 X |
| 5,071,163 | 12/1991 | Heinrichs et al. .................. 280/775 |

FOREIGN PATENT DOCUMENTS

| | | | |
|---|---|---|---|
| 0317791 | 6/1989 | European Pat. Off. ............. 280/777 |
| 2020390 | 6/1972 | Fed. Rep. of Germany ....... 280/777 |
| 2232836 | 2/1973 | Fed. Rep. of Germany . |
| 1552965 | 12/1968 | France ................................. 280/777 |
| 2585096 | 1/1987 | France . |
| 5099309 | 2/1977 | Japan . |
| 881355 | 11/1961 | United Kingdom . |

Primary Examiner—Mark Rosenbaum
Assistant Examiner—C. Richard Martin
Attorney, Agent, or Firm—Basile and Hanlon

[57] ABSTRACT

A collapsible steering shaft apparatus includes first and second telescopingly arranged steering shaft members. A plurality of longitudinally extending projections are formed in one of the steering shaft members and engage a plurality of longitudinally extending grooves formed in the other steering shaft member. The mating projections and grooves join the steering shaft members together for longitudinal sliding movement under external forces exerted on the steering shaft apparatus. The mating projections and grooves also prevent rotation of the two steering shaft members relative to each other and insure that the two steering shaft member rotate together as a unit without backlash upon rotation of the vehicle steering wheel. A method of forming the projections and grooves in the tubular steering shaft members is also disclosed.

19 Claims, 5 Drawing Sheets

COLLAPSIBLE STEERING SHAFT APPARATUS AND METHOD OF MAKING SAME

BACKGROUND OF THE INVENTION

1. Field of the Invention

The present invention relates, in general, to vehicle steering apparatus and, more particularly, to collapsible steering shaft apparatus.

2. Description of the Art

In today's vehicles, steering columns are typically designed to collapse during a collision so as to dissipate energy due to the occupant's impact with the steering wheel. Various steering columns have been devised to collapse when a certain force level is applied to the steering wheel by the occupant. Such steering columns are designed of two telescoping, tubular members. Various elements, such as frangible members, collapsible bellows, bearings, perforated sleeves, etc., are interposed between the overlapping portions of the tubular members to control the rate of collapse and to establish a predetermined force level required for the start of collapse of the steering column.

Further, in such collapsible steering apparatus, the steering shaft itself which is interconnected between the steering gear and the steering wheel must also collapse. Accordingly, such steering shafts have been formed of two separate shaft sections which are telescopingly engaged at one end. Various means have been employed to interconnect the overlapping ends of the two steering shafts to provide for simultaneous rotation of the shafts during normal use of the steering apparatus as well as to prevent any backlash or play between the two shafts. Grooves and through bores have been formed in the overlapping portions of the two shafts and filled with a moldable plastic to secure the shaft sections initially in place. The plastic is sheared by force applied to the steering wheel to enable telescoping collapse of the steering shafts. However, this technique is time consuming and requires additional manufacturing operations which add to the cost of the steering apparatus.

In a common steering shaft apparatus, the telescoping ends of the steering shaft members are formed in a so-called "TV" cross section which includes two opposed flat side walls interconnected by two arcuate side walls. The "TV" cross section extends for a short distance from the overlapping ends of the two steering shaft members before expanding into the circular cross section of the tubular, hollow steering shaft members. The "TV" cross section serves to provide longitudinal sliding telescoping movement of the two steering shaft members relative to each other during collapse of the vehicle steering apparatus and, at the same time, prevents rotation of the two steering shaft members relative to each other so that both steering shaft member rotate together as a unit when the steering wheel is turned in either direction.

However, due to the inability to maintain close tolerances between the overlapping "TV" shaped ends of the two steering shaft members, backlash and the resulting looseness between the telescopingly engaged ends of the steering shaft members results in rattles and looseness in the movement of the steering wheel. This has required the use of additional manufacturing steps, such as that described above, to securely connect the two steering shaft members together for simultaneous rotation without backlash. These additional manufacturing steps add to the cost of such steering shafts. In addition, the "TV" cross section formed on the ends of the steering shaft members requires expensive dies and equipment and a high level of expertise, all of which contribute to a high cost for the steering shaft.

Thus, it would be desirable to provide a collapsible steering shaft apparatus which overcomes the problems associated with previously devised steering shaft apparatus and methods of manufacturing the same with regard to minimizing backlash between the telescopingly engaged ends of the two collapsible steering shaft members. It would also be desirable to provide a collapsible steering shaft apparatus and method of making the same which reduces the cost of the steering shaft apparatus; while eliminating or minimizing backlash between the telescoping ends of the two collapsible steering shaft members.

SUMMARY OF THE INVENTION

The present invention is a collapsible steering shaft apparatus formed of two, telescopingly arranged, movable shaft members rotatably mounted in a steering column housing.

The collapsible steering shaft apparatus of the present invention includes first and second telescopingly engaged members, each having first telescopingly engageable ends. Projection means are formed on the first end of one of the first and second members and extend longitudinally from the first end for a predetermined distance along the length of the one of the first and second members. Groove means are formed in the first end of the other of the first and second members and extend longitudinally for a predetermined distance along the length of the other of the first and second members. The projection means and the groove means are slidably and non-rotatingly engageable over the longitudinal length of the projection means and the groove means. The shape of the projection means and the groove means is selected for secure, non-rotatable engagement of the first and second steering shaft members to prevent rotation of the first and second steering shaft members relative to each other; yet allowing the first and second steering shaft members to rotate together as a unit during normal rotation of the vehicle steering wheel.

In one embodiment, the projection means are formed in the second member concentrically surrounding the first member. The projection means preferably comprises a plurality of circumferentially spaced projections which are equally angularly spaced about the periphery of the first end of the second member. The grooves are formed in the first member in the same number and same angular spacing as the projections to provide the desired sliding interconnection between the telescoping first ends of the first and second steering shaft members.

Alternately, one projection/groove pair may be indexed by having a different depth than the remaining projection/groove pairs or angularly offset at a different angle from the remaining projection/groove pairs so as to enable the first and second steering shaft members to be slidingly assembled in only one orientation.

According to the method of the present invention, a mandrel having a plurality of grooves formed on the external surface thereof is initially inserted inside the circular cross section first end of either of the first and second steering shaft members. Balls of a selected diameter are mounted in a holder and brought into forced engagement with the peripheral side wall of the steering shaft member. The balls are radially aligned with the grooves in the mandrel. The balls are forcibly urged into the steering shaft member as the holder is moved along the length of the steering shaft member to deform the steering shaft member at the locations of the balls to a predetermined depth determined by the diameter of the ball and the force applied to the balls. In this manner, grooves are formed in the external peripheral side wall of one of the steering shaft members. A similar operation on the other steering shaft member forms radially inward projections in the first end of the other steering shaft member. The depth and shape of the projections and grooves are selected for a secure fit between the first and second steering shaft members which eliminates backlash between the two steering shaft members.

Optionally, an elongated, longitudinally and inwardly extending projection is deformably formed in one end of the outer steering shaft member. The projection engages the side wall of an inner shaft member which is slidingly disposed within the outer shaft member to rigidly interconnect the two shaft members together to further prevent backlash and to provide a minimum amount of shear force resistance. This resistance is overcome by a minimum impact force exerted on the steering shaft so as to enable telescoping collapse of the two steering shaft members.

In another embodiment, the upper and lower steering shaft members are interconnected by means of a notch formed at one end of one of the shaft members and a slot formed in the overlapping end of the other shaft member. The slot enables the outermost shaft member to be deformed by staking or other means into the notch formed on the inner shaft member. This arrangement locks the two shaft members together and, due to the deformed portion of the outer shaft member which is forced into the notch in the inner shaft member, prevents the two steering shaft members from axial outward separation during normal operation of the vehicle steering apparatus.

The collapsible steering shaft apparatus of the present invention provides a unique and inexpensive means for interconnecting the telescoping steering shaft members of a vehicle steering assembly which eliminates numerous manufacturing steps and provides a simple and expedient means for insuring a collapsible, non-relative rotation interconnection of the telescopingly arranged steering shaft members. Expensive manufacturing equipment or a high level of expertise is not required in the method of the present invention to form the projections and grooves in the steering shaft members which results in a reduced manufacturing cost for the steering shaft apparatus as compared to steering apparatus constructed in accordance with prior manufacturing methods.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

The present invention is a collapsible steering shaft apparatus and method of making the same. The collapsible steering shaft apparatus has widespread use and, although the following description relates to the use of such an apparatus in a steering apparatus of a vehicle, it will be understood that the collapsible steering shaft apparatus of the present invention may be employed in many other diverse applications.

Figures 1, 3, 9:
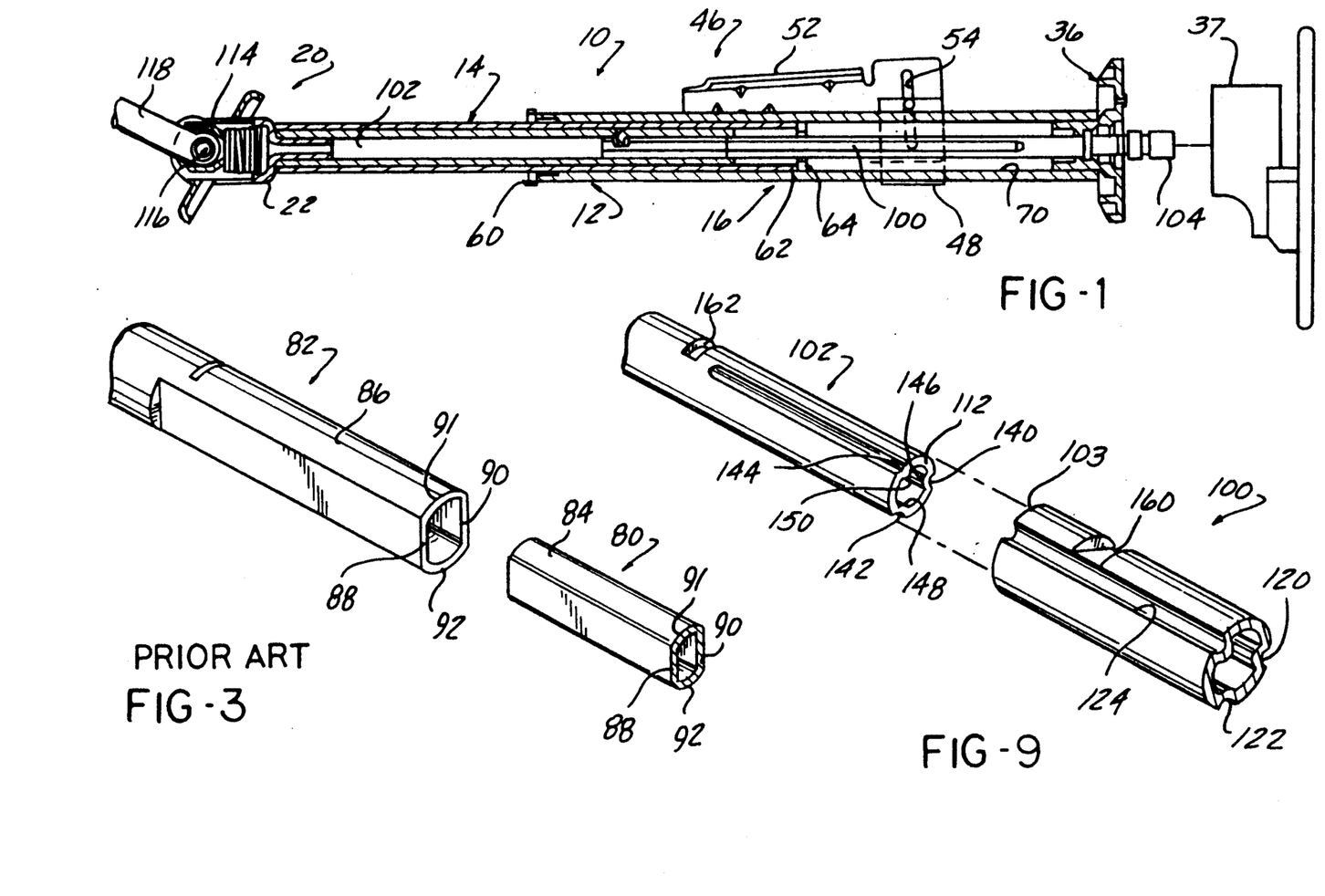
FIG. 1 is a partially cross sectioned, side elevational view of a vehicle steering apparatus including the steering shaft apparatus of the present invention.
FIG. 3 is an exploded, partial, perspective view showing a prior art construction of a telescoping steering shaft apparatus.
FIG. 9 is an exploded, partial, perspective view showing the telescoping interconnection of the upper and lower steering shaft members shown in FIGS. 4-8.
Figure 2:
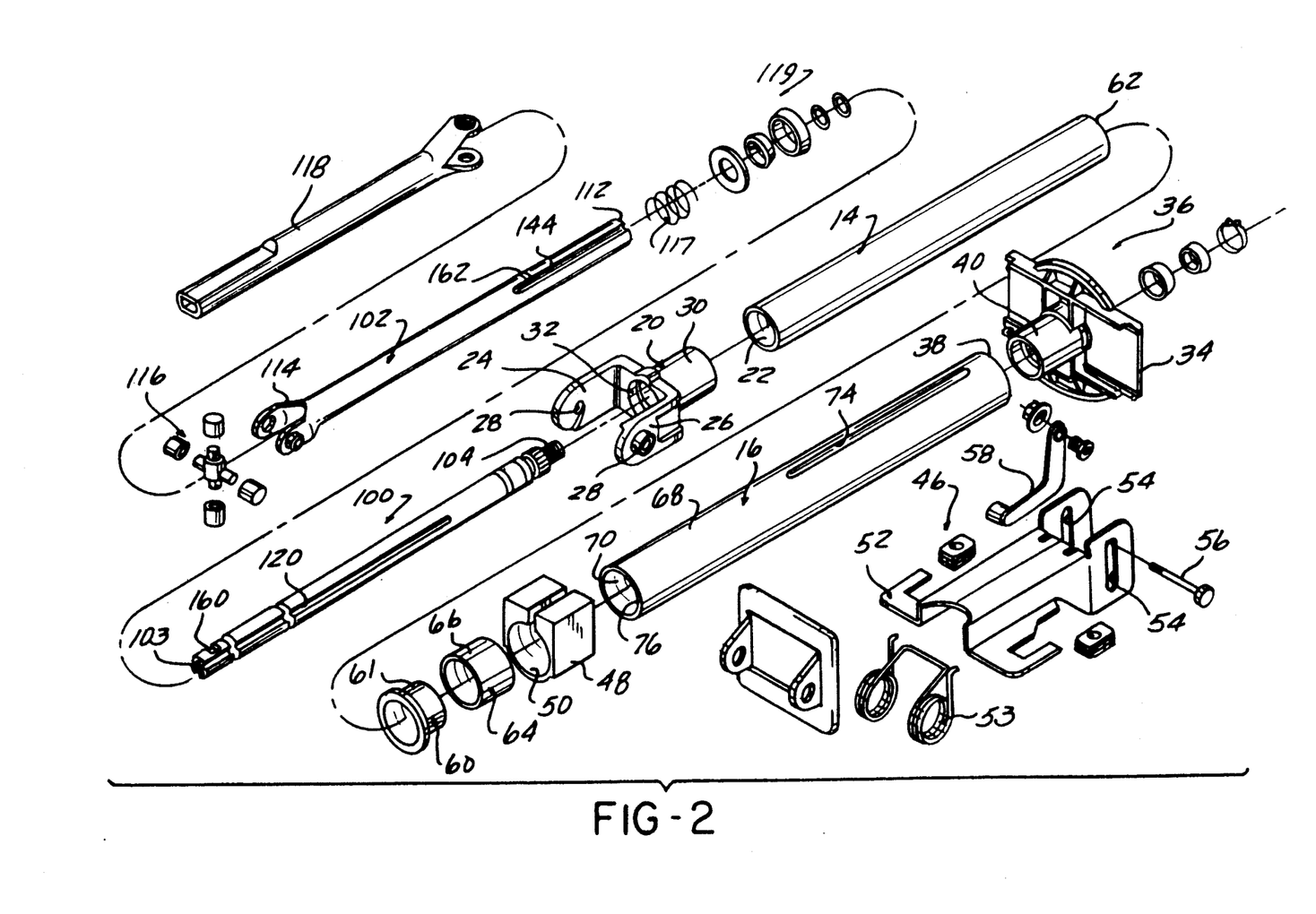
FIG. 2 is an exploded view of the steering apparatus shown in FIG. 1.

By way of background and for a complete understanding of the use of the present invention, FIGS. 1 and 2 depict a collapsible steering column apparatus 10 employed in a steering apparatus in a vehicle, such as an automobile, truck, etc. The steering column apparatus 10 includes a steering column 12 formed of a first, inner housing 14 and a second, outer housing 16. The first and second housings 14 and 16, respectively, are telescopingly arranged and overlap at respective first ends.

The first and second housings 14 and 16 are in the form of hollow tubular members having a circular cross section. Other shapes, such as square or a combination of square and arcuate, may also be used for the housings 14 and 16. Further, while the second housing 16 is depicted as telescoping over the first housing 14, a reverse arrangement where the second housing 16 telescopes inside of the first housing 14 may also be employed.

Although not forming a part of the present invention, the following description of the operative elements of the steering apparatus 10 will be provided for a complete understanding of the use and function of the energy absorbing apparatus of the present invention. As shown in FIGS. 1 and 2, the steering apparatus 10 includes a first bracket means 20 which is connected to one end 22 of the first steering column housing 14. The first bracket means 20 includes a yoke formed of two spaced, opposed legs 24 and 26 which are pivotally connected through bores 28 and pivot members, not shown, to a rigid support structure, such as the rigid structure of a vehicle. The end 22 of the first housing 14 bears on the yoke which fixedly supports the first housing 14 in a longitudinal direction. A tubular boss 30 extends outward from the yoke and engages one end 22 of the first steering column housing 14. The boss 30 may be connected to the first steering column housing 14 by means of a press fit or it may be joined to the first steering column housing 14 by other suitable means, such as welding, etc. A bore 32 extends through the boss 30 and slidably receives a steering shaft assembly, described hereafter.

A second bracket means 36 is connected to one end 38 of the second steering column housing 16. The second bracket means 36 includes a base 38 which is configured for receiving column switch assemblies, not shown, to control various operating circuits and elements on the vehicle. A boss 40 extends outward from the base 38 and is press fit into one end 38 of the second steering column housing 16. Alternately, the second bracket means 36 may be connected to the second steering column housing 16 by other means, such as welding, suitable fasteners, etc.

The second bracket means 36 is designed to rotatably support one end of the steering shaft assembly, described hereafter. A steering wheel 37, which optionally includes an inflatable air bag assembly mounted therein, is fixedly connected to the end of the steering shaft extending outward from the second bracket means 36, with the second bracket means 36 providing a mounting support for the steering wheel 37.

A third bracket means 46 is mounted intermediate the ends of the steering column housing 12 to provide selective tilting of the steering column housing 12 about the first end 22 attached to the first bracket means 20. The third bracket means 46 includes a clamp block 48 having an internal bore 50 which is slidably mounted over the outer second steering column housing 16. A mounting plate 52 is attached to the clamp block 48 and surrounds an upper portion of the tubular second steering column housing 16. A pair of slots 54 are formed in arms extending outward from the mounting plate 52 and receive a bolt 56 which is connected to a pivotal lever 58. The plate 52 is attached to stationary support structure, such as stationary structure of a vehicle. A biasing spring 53 connected between the plate 52 and the clamp block 48 biases the steering column 12 in an upward direction. Movement of the lever 58 in a release direction moves the movable side portions of the clamp block 48 out of engagement with the steering column housing 16 and enables the entire steering column housing 12 to be pivoted to any desired angular position with respect to the pivotal first end 22 connected to the first bracket means 20. Opposite movement of the lever 58 locks the steering column housing 16 in a desired, fixed position.

Non-deformable means are formed on one end of the first steering column housing 16. The non-deformable means may be constructed by hardening, such as via heat treatment, at least the end portion or all of the first steering column housing 16. However, in a typical steering column the first housing 14 is formed of a mild steel. A non-deformable, hardened ring, bushing or plug 64 is therefore mounted in a second end 66 of the first steering column housing 14, as shown in FIG. 2. The ring 64 has an outer, peripheral surface 66 which is slidably disposed within a second end portion 68 of the second steering column housing 16. The annular surface 66 of the ring 64 has a predetermined diameter so as to provide a predetermined amount of clearance with respect to the inner surface 70 of the second steering column housing 16; yet is larger than the diameter of the first housing 14. The ring 64 has an internal shoulder which seats on the end 67 of the housing 14. An outer bushing 60 is mounted in the end 76 of the second housing 16 and engages the first or inner housing 14 to provide a two point load support in conjunction with the ring 64. The outer bushing 60 is preferably formed of a resilient plastic and includes an enlarged, annular flange 61.

A plurality of projections are formed in the second steering column housing 16 and are deformably engaged by the ring 64 during telescoping movement of the second steering column 16 over the first steering column housing 14. As described hereafter, the projections may be provided in the form of at least one projection deformably formed in the second steering column housing 16 and extending radially inward from the inner surface 70 of the second steering column housing 16. The projection(s) may have any desired length, width or projection height and may be provided in any number on the second housing 16, including at least one projection; although a plurality of projections are preferred.

Preferably, the projections include three, identical, equidistantly, circumferentially spaced projections which are formed in the second steering column housing 16. The projections may be formed by any suitable means, such as by forcing a hardened ball into the exterior surface of the second steering column housing 16 to form a groove 74 in the exterior surface of the second side wall of the steering column housing 16 and a corresponding projection extending radially inward from the side wall into the hollow interior of the second steering column housing 16.

As shown in FIGS. 1 and 2, each of the projections has a predetermined, identical length extending from the end 76 of the second steering column housing 16. During the assembly of the steering column housings 14 and 16, the first steering column housing 14 carrying the hardened ring 64 at one end is slidably inserted into the second end 76 of the second steering column housing 16 a sufficient distance to bring the ring 64 into engagement with the end or start of the projections. Force is then exerted on the first steering column housing 14 to forcibly urge the ring 64 into the projections and thereby deforming the projections radially outward toward the side wall of the second steering column housing 16. The ring 64 is advanced only a short distance from the start of the projections to bring the first and second steering column housings 14 and 16 into a fixed, rigid engagement which eliminates play or backlash between the first and second steering column housings 14 and 16, respectively, During operation, when a force is exerted on the steering wheel, such as during a collision of the vehicle, such force will be transmitted through the steering wheel and first bracket means 36 to the first end 38 of the second steering column housing 16. This will forcibly urge the second steering column housing 16 over the first steering column housing 14 and cause a telescoping collapse of the first and second steering column housings 14 and 16 with respect to each other. During such collapse, the hardened ring 64 will engage and deform the projections to absorb the force exerted on the steering column apparatus 10 at a controlled, predetermined rate depending on the size, shape and number of projections.

The projections may also be provided in alternate arrangements to provide different force versus displacement characteristics depending upon the requirements of a particular application. Thus, a plurality of sets of projections, not shown, each set formed of a plurality of projections having a predetermined, distinct, discrete length, may be provided along the second steering column housing 16.

The height of each projection may also be varied. Each projection may extend at the predetermined height for a predetermined distance along the length of the second steering column housing 16. The height of the projection may be increased or decreased, either gradually or, in a discrete step to a second, different height. A second discrete step may also be formed in each projection at a further distance from the second end 76 of the second steering column housing 16 to provide a third height or inward extension of the projection into the interior of the second steering column housing 16.

It will be seen that increasing or decreasing the radially inward extent of the projection(s) will vary the deformation force exerted on the second steering column housing 16 by the ring 64 and thereby provide a predetermined force versus displacement characteristic during the telescoping collapse of the first and second steering column housings 14 and 16.

The width of each projection may also be varied along the length of the steering column housing 16. Although relatively narrow width projections are preferred, the width of the projections, especially where only one projection is employed, may be increased up to the full circumference of the second housing 16 to form a circumferential necked section in the housing 16. According to this embodiment, each projection is provided with a first width extending a predetermined distance from the first end of each projection. The width of each projection may increase to a second width, either gradually or in a discrete step. Alternately, the width of each projection may decrease, either gradually or in a discrete step. Additional steps may also be provided in each projection to further increase or decrease the width of each projection and thereby provide a desired force versus displacement characteristic for the telescoping collapse of the steering column 12.

It will be understood that the projections formed on the second steering column housing 16 may be provided in any of the above-identified configurations, including projections of various lengths, widths, projection heights and number of projections. For example, the width and projection height of the projections may be simultaneously increased or decreased along the length of such projections to provide a desired force versus displacement characteristic. Regardless of the manner of formation of the projection means, the end result is to provide a controlled force versus displacement characteristic for the telescoping first and second steering column housings 14 and 16 during a forced collapse of the first and second steering column housings 14 and 16 by a force exerted at one end of the second steering column housing 16.

The steering apparatus 10 of the present invention also includes a two-part steering shaft including a first or upper shaft 100 and a second or lower shaft 102. The first and second steering shafts 100 and 102, respectively, are also configured for telescoping, collapsible engagement coincident with the collapse of the steering column housing 12. The second end 103 of the first shaft 100 telescopingly fits within a hollow first end portion 112 of the second steering shaft 102. The second end 114 of the second shaft 102 is formed in a yoke which receives a conventional X-joint 116 for interconnection to a conventional steering shaft assembly 118.

A biasing spring 117 surrounds the lower end of the shaft 102 and seats on the yoke-shaped end 114 of the shaft 102. The spring 117 acts through a washer, cone, bearings and 0-ring assembly denoted by reference number 119 to apply a load on the interconnected shafts 100 and 102.

For a better understanding of the features of the present invention, a brief description of a typical prior art steering shaft assembly will be provided. As shown in FIG. 3, a conventional steering shaft assembly includes upper and lower steering shaft members 80 and 82. The steering shaft members 80 and 82 are telescopingly engageable at first end portions 84 and 86, respectively.

Each of the first end portions 84 and 86 is constructed with a so-called "TV" cross section formed of a pair of spaced, opposed flat side walls 88 and 90 which are interconnected at opposite ends by a pair of spaced, opposed arcuate or curved side walls 91 and 92. This cross section enables the upper and lower steering shaft members 80 and 82 to slide together during telescoping collapse of the steering assembly; yet prevents the steering shaft members from rotating relative to each other while rotating together as a unit upon turning of the steering wheel attached to the upper end of the upper steering shaft member.

However, the "TV" cross section requires expensive and complex equipment and a high level of expertise to form such a cross section with the desired dimensional tolerances.

A less expensive steering shaft assembly is provided by the present invention as shown in FIGS. 1 and 2, and in greater detail in FIGS. 4–10.

Figure 4:
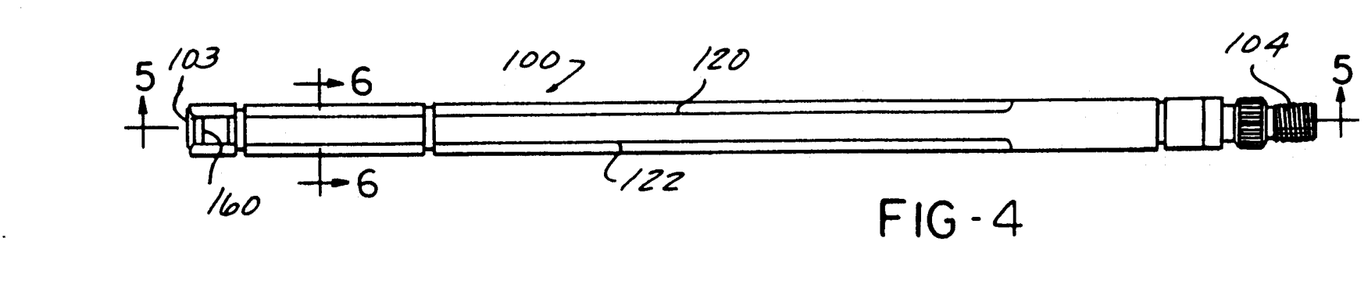
FIG. 4 is a side elevational view of an upper steering shaft member constructed in accordance with the teachings of the present invention.
Figures 5, 7:
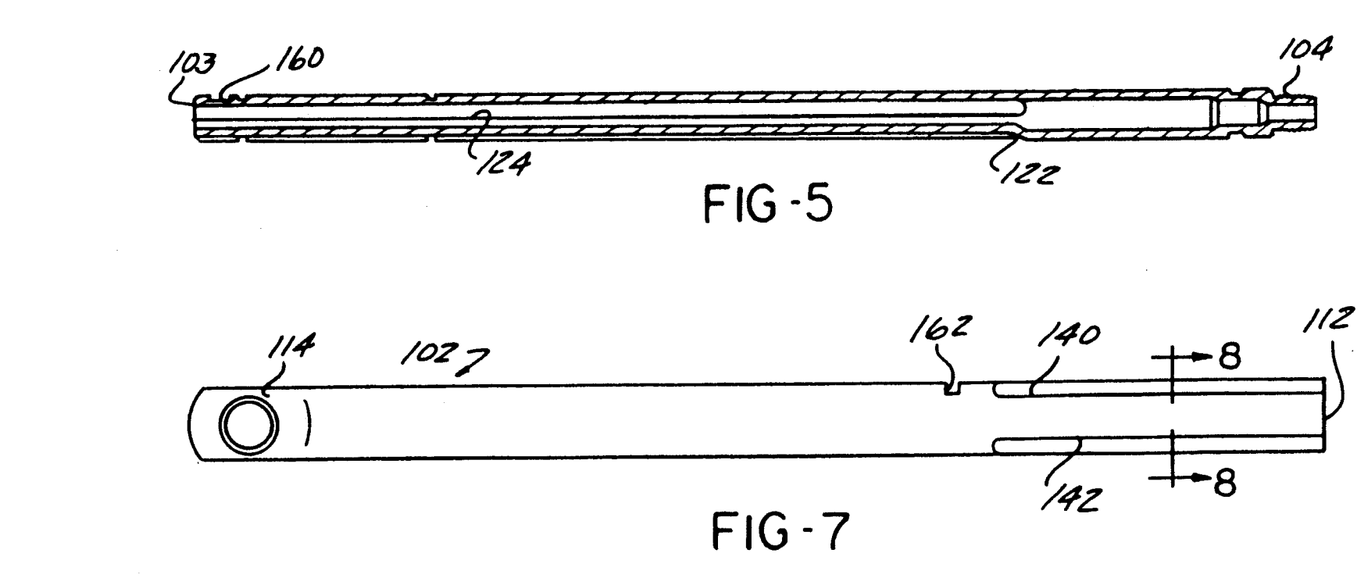
FIG. 5 is a cross sectional view generally taken along line 5—5 in FIG. 4.
FIG. 7 is a side elevational view of a lower steering shaft member constructed in accordance with the teachings of the present invention.

As shown in FIGS. 4 and 5, the first or upper steering shaft member 100 has first and second opposed ends 103 and 104, respectively. The first steering shaft member 100 is preferably formed of a high strength steel and has a generally hollow, tubular shape with a generally circular cross section. The second end 104 is threaded, as is conventional, for receiving a steering wheel 37 thereon.

The second or lower steering shaft member 102, shown in detail in FIG. 7, has a first end 112 spaced from the opposed, yoke-shaped end 114. The second steering shaft member 102 is likewise formed of a hollow, tubular member of a high strength steel.

The diameter of the first end 103 of the first steering shaft member 100 and the diameter of the first end 105 of the second steering shaft member 102 are selected such that the first ends 103 and 105 of the first and second steering shaft members 100 and 102, respectively, are telescopingly engageable with each other for a predetermined length of each of the two members 100 and 102.

According to the present invention, projection means are formed in the first end of one of the first and second steering shaft members 100 and 102 and complimentarily-shaped groove means are formed in the other of the first and second steering shaft members 100 and 102 to provide sliding, telescoping engagement of the first ends 103 and 105 of the first and second steering shaft members 100 and 102, respectively, together. It will be understood that the projection means may be formed in either of the first and second steering shaft members, with the groove means formed in the other of the first and second steering shaft members 100 and 102. The following example is one embodiment describing an exemplary construction of the projection and groove means.

Figure 6:
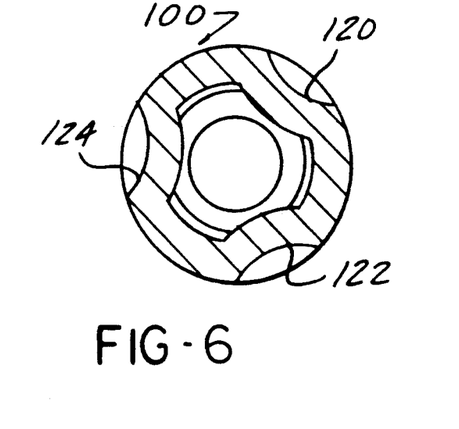
FIG. 6 is an enlarged cross sectional view generally taken along line 6—6 in FIG. 4.

As shown in FIGS. 4, 5 and 6, groove means are formed in the first end 103 of the first steering shaft member 100 and extend longitudinally for a predetermined length along the first steering shaft member 100. Although a single groove means may be employed, additional rigidity and non-rotation characteristics described hereafter, are obtained by providing a plurality, such as of grooves, such as three, for example, in the first steering shaft member 100. Thus, a plurality of circumferentially, angularly spaced, radially inwardly extending grooves 120, 122 and 124 are formed in the first steering shaft member 100 and extend from the first end 103 a predetermined longitudinal distance along the length of the first steering shaft member 100. The grooves 120, 122 and 124 have a generally arcuate shape, as shown in FIG. 6, and are formed according to the method described hereafter. The grooves 120, 122 and 124 result from the localized deformation of certain portions of the side wall of the first steering shaft member 100. The portion of the side wall of the first steering shaft member 100 between the grooves 120, 122 and 124 retains its generally circular shape, as shown in FIG. 6.

The depth of each of the grooves 120, 122 and 124 is selected to provide the least amount of deformation of the first steering shaft member 100; while providing a high degree of angular contact and maximum torsional stiffness when the first steering shaft member 100 is telescopingly engaged with the second steering shaft member 102.

According to the exemplary embodiment shown in FIGS. 4, 5 and 6, the three grooves 120, 122 and 124 are equally angularly spaced about the periphery of the first steering shaft 100 substantially 120° apart.

Figure 13:
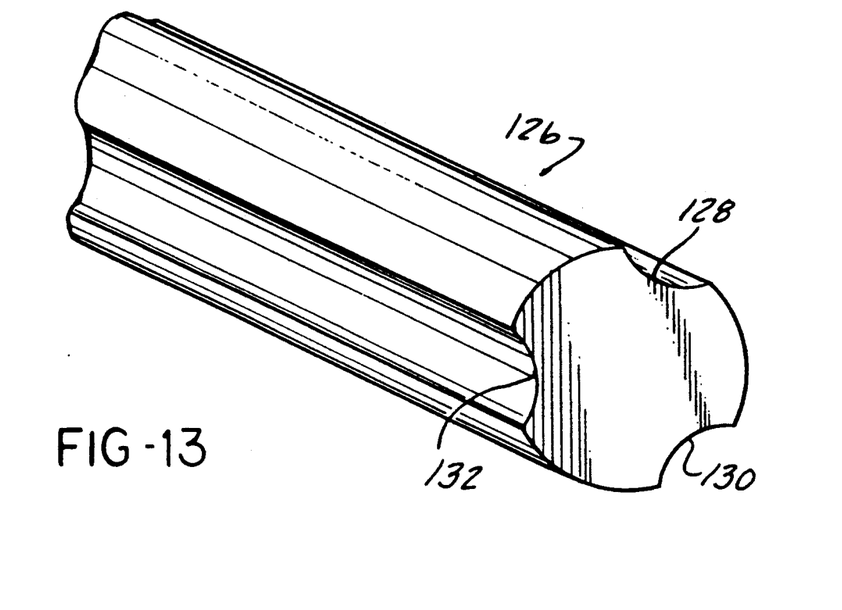
FIG. 13 is a partial, perspective view showing an embodiment of a mandrel employed in the method of constructing the steering shaft apparatus of the present invention.
Figure 14:
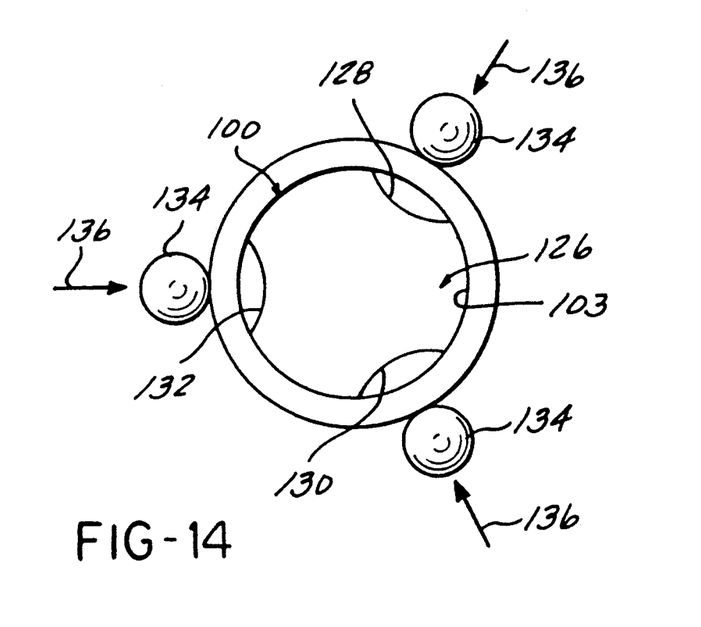
FIG. 14 is an end assembly view showing the use of the mandrel and a plurality of balls to form the projections/grooves in the steering shaft members of the present invention.

Referring briefly to FIGS. 13 and 14, the method of forming the grooves 120, 122 and 124 in the first steering shaft member 100 will now be described. As shown in FIGS. 13 and 14, a generally cylindrical mandrel 126 is formed with three longitudinally extending grooves 128, 130 and 132. The grooves 128, 130 and 132 have a generally arcuate shape. Alternately, the grooves 128, 130 and 132 may have square side walls. The mandrel 126 is initially inserted inside the hollow first end 103 of the first steering shaft member 100 as shown in FIG. 14.

A plurality of hardened balls each shown by reference number 134 are mounted in a suitable holder or collar, not shown, and disposed at locations corresponding to the locations of the grooves 128, 130 and 132 in the mandrel 126. Force in the direction of the arrows 136 is applied to each of the balls 134 as the holder is moved along the length of the mandrel 126 to force the balls 134 into the side wall of the first steering shaft member 100 and cause a localized deformation of the side wall of the first steering shaft member 100 at the location of each ball 134. This forms the outwardly opening grooves 120, 122 and 124 in the first steering shaft member 100.

Figure 8:
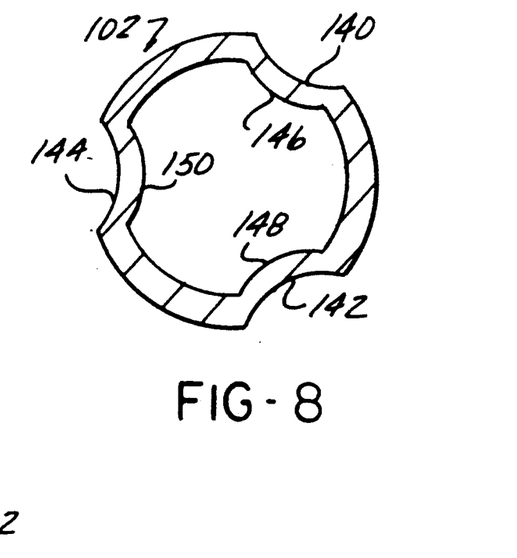
FIG. 8 is an enlarged cross sectional view generally taken along line 8—8 in FIG. 7.

As shown in FIGS. 7 and 8, projection means comprising at least one and, preferably, a plurality of individual projections, such as three for example only, are formed in the first end 112 of the second steering shaft member 102 and extend for a predetermined distance along the length of the second steering shaft member 102 from the first end 112 thereof. The projections may have a short longitudinal extent to form a point-like projection. Preferably, however, the projections extend for a longer length, as shown in FIGS. 2 and 9 for added contact with the mating grooves 120, 122 and 124 in the other steering shaft member 100.

The projections result from grooves 140, 142 and 144 formed in the second steering shaft member 102 and located at the same angular arrangement as the grooves 120, 122 and 124 in the first steering shaft member 100 so as to provide sliding, telescoping movement between the first and second steering shaft members 100 and 102. The grooves 140, 142 and 144 in the second steering shaft member are formed by means of a mandrel and forcible balls as described above for the first steering shaft member 100 and shown in FIGS. 13 and 14. The formation of the grooves 140, 142 and 144 in the side wall of the second steering shaft member 102 results in radially inwardly extending projections 146, 148 and 150 opposite from the corresponding grooves 140, 142 and 144, respectively. The projections 146, 148 and 150 have a shape complimentary to the shape of the grooves 120, 122 and 124 in the first steering shaft member.

Figure 10:
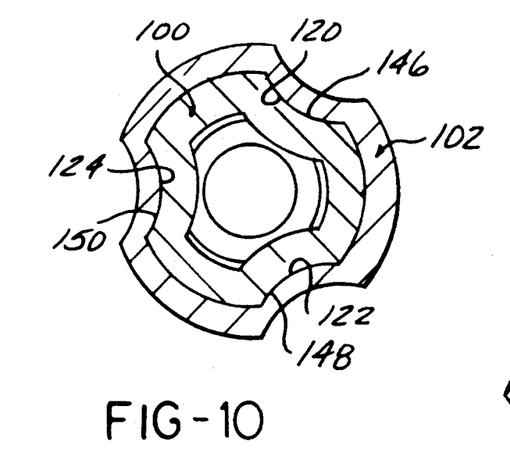
FIG. 10 is a cross sectional view through the telescopingly engaged portions of the upper and lower steering shaft members shown in FIGS. 4-9.

As shown in FIGS. 9 and 10, the first and second steering shaft members 100 and 102 are aligned during assembly with the grooves 120, 122 and 124 in the first steering shaft member 100 slidably engaging corresponding ones of the projections 146, 148 and 150 in the second steering shaft member 102. This provides telescoping, sliding engagement of the first and second steering shaft members 100 and 102 along the length of the corresponding, mating projections and grooves. During such engagement, the groove 120 in the first steering shaft member 100 slidably engages the projection 146 in the second steering shaft member. Likewise, groove 122 slidably engages projection 148 and groove 124 engages projection 150.

Although not shown, the first and second steering shaft members 100 and 102 may be indexed to provide for only one orientation for sliding engagement of the first and second steering shaft members 100 and 102. This indexing may be provided by forming one of the projection/groove pairs, such as projection 150 in the second steering shaft member 102 and the corresponding groove 124 in the first steering shaft member 100, with a different depth, such as less or greater, than the depth of the corresponding mating projection/groove pairs. Alternately, the angular spacing of the projection 150/groove 124 pair from the adjacent projection/groove pairs may be different from the angular spacing between the remaining two projection/groove pairs to insure that the first steering shaft member 100 is oriented in only one position for sliding insertion into the first end 105 of the second steering shaft member 102.

Figure 11:
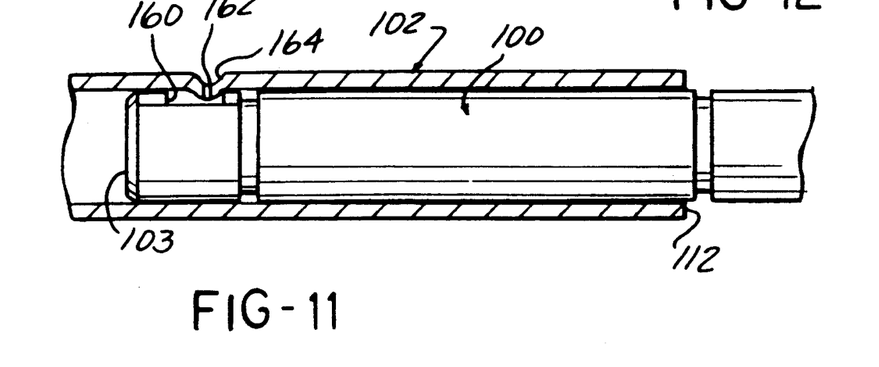
FIG. 11 is a partially cross sectioned, side elevational view showing a non-separable interconnection of the steering shaft members in accordance with another embodiment of the present invention.

As shown in FIGS. 2 and 11, a shallow notch 160 is optionally formed in and spaced from the first end 103 of the first steering shaft member 100. A slot 162 is formed in and spaced from the second end 105 of the second steering shaft member 102 and is adapted to overly the notch 160 in the first steering shaft member 100 when the first and second steering shaft members 100 and 102 are brought into telescoping engagement. The portion of the second shaft 102 adjacent the slot 162 is then mechanically deformed, such as by staking, to form a depression denoted by reference number 164 in FIG. 11 which brings a portion of the second steering shaft member 102 into mechanical connection with the notch 160 in the first steering shaft member 100. This prevents any longitudinal outward separation of the first and second steering shaft members 100 and 102 from each other during normal operation of the steering apparatus 10.

Figure 12:
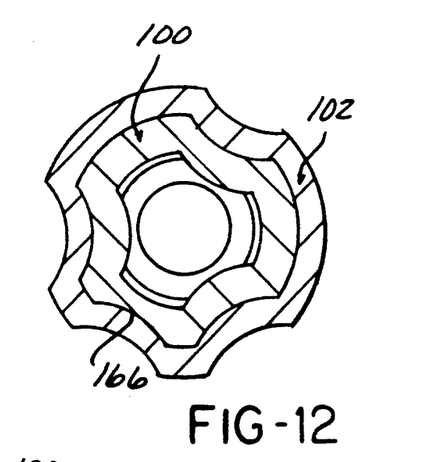
FIG. 12 is a cross sectioned view, similar to FIG. 10, but showing another embodiment of the present invention having means to rigidly interconnect the steering shaft members together.

As shown in FIG. 12, the first and second steering shaft members 100 and 102 may also be further interconnected in a rigid manner for simultaneous rotation by means of an elongated projection 166 which is formed in the side wall adjacent the second end 112 of the second steering shaft member 102 after ends of the steering shaft members 100 and 102 are telescopingly engaged. The projection 166 extends radially inward from the side wall of the second steering shaft member 102 and locally deforms the opposed side wall of the first steering shaft member 100. This rigidly interconnects the first and second steering shaft members 100 and 102 to further prevent play or backlash. The mechanical connection between the projection 166 and the first steering shaft member 100 also forces the first steering shaft member 100 into rigid connection with the second steering shaft member 102 and provides a predetermined amount of force which must be overcome to initiate telescoping movement of the first steering shaft member 100 into the second steering shaft member 102 during collapse of the steering column 10.

In summary, there has been disclosed a unique collapsible steering shaft apparatus which is particularly suited for use in vehicle steering assemblies. The collapsible steering shaft apparatus includes longitudinal grooves formed on one telescoping steering shaft member which slidably engage projections formed in the other steering shaft member. The mating projection and grooves are easily formed by inexpensive equipment and in a fast and expedient manner which results in a lower cost steering shaft assembly as compared to steering shaft assemblies constructed according to prior manufacturing techniques. At the same time, the projection and grooves formed in the telescoping ends of the first and second steering shaft members eliminate backlash between the two steering shaft members which prevents rattle and looseness in the steering assembly.

What is claimed is:

1. A collapsible steering shaft apparatus comprising:
   first and second telescopingly engageable members, each having a first telescopingly engageable end;
   at least one radially inwardly extending projection preformed as a localized deformation in the first end of a side wall of the second member;
   at least one radially inwardly extending groove preformed as a localized deformation in the first end of a side wall of the first member and extending longitudinally from the first end of the first member for a selected distance;
   the at least one projection and the at least one groove being non-rotatingly and non-deformably engageable and freely longitudinally slidable with respect to each other over the distance of the groove;
   a notch preformed in the first end of the first member transverse to the longitudinal axis of the first member and extending over a limited angular extent of the first member; and
   a slot preformed in and extending through a side wall of the first end of the second member transverse to the longitudinal axis of the second member and over a limited angular extent of the second member, portions of the second member defining the slot deformed into the notch when the first end of the second member telescopingly overlays the first end of the first member to separably and axially interconnect the first and second members together in a fixed longitudinal position.

2. The apparatus of claim 1 wherein:
   the first member is disposed concentrically inward of the second member.

3. The apparatus of claim 1 further comprising a plurality of grooves and projections preformed in the first and second members, respectively.

4. The apparatus of claim 3 wherein the plurality of grooves and projections are equi-circumferentially spaced about the first ends of the first and second members, respectively.

5. The apparatus of claim 1 wherein the first and second members have a circular cross section.

6. The apparatus of claim 1 further comprising:
   a longitudinally extending projection formed as a localized deformation in one end of the second member and deformably engageable into fixed peripheral surface contact with the first end of the side wall of an inner disposed first member to fixedly interconnect the first and second members together.

7. A collapsible steering shaft apparatus comprising:
   first and second telescopingly engaging members, each having a circular cross section and first telescopingly engageable ends;
   a plurality of projections preformed as localized deformations the first end of the second member, the projections being equi-angularly circumferentially spaced about the periphery of the first end of the second member and extending radially inward of a side wall of the second member;
   a plurality of radially inward extending grooves preformed as localized deformations in the first end of the first member and extending longitudinally from the first end of the first member, the grooves being provided in the same number as the projections and equi-angularly circumferentially spaced about the periphery of the first end of the first member;
   the projections and grooves being non-rotating and non-deformably engageable and freely longitudinally slidable over the length of the grooves;
   a notch preformed in the first end of the first member transverse to the longitudinal axis of the first member and extending over a limited angular extent of the first member; and
   a slot preformed in and extending through a side wall of the first end of the second member transverse to the longitudinal axis of the second member and over a limited angular extent of the second member, portions of the second member defining the slot deformed into the notch when the first end of the second member telescopingly overlays the first end of the first member to separably and axially interconnect the first and second members together in a fixed longitudinal position.

8. A vehicle steering apparatus comprising:
   a hollow tubular steering column housing;

bracket means, mounted on the housing, for mounting the housing to stationary vehicle structures;

a steering column shaft formed of first and second telescopingly engageable steering column members rotatingly mounted in the steering column housing and having opposite ends extending outward from opposite ends of the steering column housing;

first and second telescopingly engageable members, each having a first telescopingly engageable end;

at least one radially inward extending projection preformed as a localized deformation in the first end of a side wall of the second member;

at least one radially inwardly extending groove preformed as a localized deformation in the first end of a side wall of the first member and extending longitudinally from the first end of the first member for a selected distance;

the at least one projection and the at least one groove being non-rotatingly and non-deformably engageable and freely longitudinally slidable over the distance of the groove means;

a notch preformed in the first end of the first member transverse to the longitudinal axis of the first member and extending over a limited angular extent of the first member; and a slot preformed in and extending through a side wall of the first end of the second member transverse to the longitudinal axis of the second member and over a limited angular extent of the second member, portions of the second member defining he slot deformed into the notch when the first end of the second telescopingly overlays the first end of the first member to separably and axially interconnect the first and second members together in a fixed longitudinal position.

9. The vehicle steering apparatus of claim 8 wherein: the first member is disposed concentrically inward of the second member.

10. The vehicle steering apparatus of claim 8 further comprising a plurality of grooves and projections preformed in the first and second members, respectively.

11. The vehicle steering apparatus of claim 10 wherein the plurality of grooves and projections are equi-circumferentially spaced about the first ends of the first and second members, respectively.

12. The vehicle steering apparatus of claim 10 wherein the first and second members have a circular cross section.

13. The vehicle steering apparatus of claim 8 further comprising:

a longitudinally extending projection formed as a localized deformation in one end of the second member and deformably engageable into fixed peripheral surface contact with the first end of an inner disposed first member to fixedly interconnect the first and second members together.

14. A vehicle steering apparatus comprising:

a hollow tubular steering column housing;

bracket means, mounted on the housing, for mounting the housing to stationary vehicle structures;

a steering column shaft formed of first and second telescopingly engageable steering column members rotatingly mounted int he steering column housing and having opposite ends extending outward from opposite ends of the steering column housing;

first and second telescopingly engaging members, each having a circular cross section and first telescopingly engageable ends;

a plurality of radially inward extending projections preformed as localized deformations on the first end of the second member, the projections being equi-angularly circumferentially spaced about the periphery of the first end of the second member;

a plurality of radially inward extending grooves preformed as localized deformations in the first end of the first member and extending longitudinally form the first end of the first member, the grooves being provided in the same number as the projections and equi-angularly circumferentially spaced about the periphery of the first end of the first member;

the projections and grooves being non-rotatingly and non-deformably engageable and freely longitudinally slidable over the length of the grooves;

a notch preformed in the firs end of the first member transverse to the longitudinal axis of the first member and extending over a limited angular extent of the first member; and a slot preformed in and extending through a side wall of the first end of the second member transverse to the longitudinal axis of the second member and over a limited angular extent of the second member, portions of the second member defining the slot deformed into the notch when the first end of the second member telescopingly overlays the first end of the first member to separably and axially interconnect the first and second members together in a fixed longitudinal position.

15. A method of manufacturing a steering shaft apparatus comprising the steps of:

forming a first steering shaft member having a tubular, hollow first end;

forming a second steering shaft member having a tubular first end and a diameter sized to telescopingly engage the first end of the first steering shaft member;

preforming at least one longitudinally and radially inward extending projection in the first end of the second steering shaft member by localized deformation of a side wall of the second steering shaft member;

preforming at least one longitudinally and radially inward extending groove in the first end of the first steering shaft member by localized deformation of a side wall of the first steering shaft member;

forming the shape and depth of the at least one projection and the at least one groove so that the at least one projection and groove are non-rotatingly and non-deformably engagable and freely longitudinally slidable with respect to each other over the distance of the groove;

preforming a notch in the first end of the first member transverse to the longitudinal axis of the first member and extending over a limited angular extent of the first member;

preforming a slot in and extending through a side wall of the first end of the second member transverse to the longitudinal axis of the second member and over a limited angular extent of the second member; and telescopingly overlaying the first end of the second member over the first end of the first member to separably and axially interconnect the first and second members together in a fixed longitudinal position; deforming portions of the second member defining the slot into the notch.

16. The method of claim 15 further comprising the steps of:
- preforming a plurality of longitudinally extending projections in the first end of the second steering shaft member, the projections being circumferentially spaced about the periphery of the second steering shaft member; and
- preforming a plurality of longitudinally extending grooves in the first end of the first steering shaft member, the grooves being circumferentially spaced about the periphery of the first steering shaft member, each groove arranged to slidably engage one of the projections.

17. The method of claim 16 wherein the grooves and projections are equi-angularly spaced about the periphery of the first and second steering shaft members, respectively.

18. A collapsible steering shaft apparatus comprising:
- first and second telescopingly engageable members, each having a first telescopingly engageable end;
- projection means formed as a localized deformation in the first end of a side wall of the second member; and
- groove means formed as a localized deformation in the first end of a side wall of the first member and extending longitudinally from the first end of the first member for a selected distance;
- the projection means and the groove means being non-rotatingly and non-deformably engageable and freely longitudinally slidable with each other over the distance of the groove means;
- means, preformed in the first end of the first member, for receiving a deformed portion of the second member in a mechanical connection; and
- deformable means, preformed in a non-deformed condition in the first end of the second member, for deformably engaging the receiving means in the first member when the first end of the second member telescopingly overlays the first end of the first member to separably interconnect the first and second members together in a fixed longitudinal position.

19. The collapsible steering shaft apparatus of claim 18 wherein:
- the receiving means comprises a notch preformed in the first member transverse to the longitudinal axis of the first member and extending over a limited angular extent of the first member; and
- the deformable means comprises a slot preformed in and extending through a side wall of the second member transverse to the longitudinal axis of the second member and over a limited angular extent of the second member, portions of the second member defining the slot being deformed into the notch when the first end of the second member telescopingly overlays the first end of the first member to separably and axially interconnect the first and second members together in a fixed longitudinal position.

* * * * *